(12) United States Patent
Lachat et al.

(10) Patent No.: US 7,845,682 B2
(45) Date of Patent: Dec. 7, 2010

(54) AIRBAG CUSHION FOLDING METHODS

(75) Inventors: Michael Lachat, Shelby Township, MI (US); Anna Libby, Lake Orior, MI (US); Howard Lusk, Rochester, MI (US); Jesse Benny, Auburn Hills, MI (US); Joseph Bator, Bad Axe, MI (US); Larry Rose, South Weber, UT (US); Marc P. Russell, Plain City, UT (US); Jeffrey D Williams, Roy, UT (US); Ralph Tree, Farr West, UT (US)

(73) Assignee: Autoliv ASP, Inc., Ogden, UT (US)

( * ) Notice: Subject to any disclaimer, the term of this patent is extended or adjusted under 35 U.S.C. 154(b) by 109 days.

(21) Appl. No.: 12/349,341

(22) Filed: Jan. 6, 2009

(65) Prior Publication Data

US 2009/0108574 A1 Apr. 30, 2009

Related U.S. Application Data

(63) Continuation-in-part of application No. 12/259,221, filed on Oct. 27, 2008, which is a continuation-in-part of application No. 11/115,928, filed on Apr. 27, 2005, now Pat. No. 7,441,804.

(51) Int. Cl.
*B60R 21/237* (2006.01)
(52) U.S. Cl. .................................. 280/743.1
(58) Field of Classification Search ............... 280/743.1, 280/729, 728.1
See application file for complete search history.

(56) References Cited

U.S. PATENT DOCUMENTS

| | | | |
|---|---|---|---|
| 3,748,477 A | 7/1973 | Wulbrecht | |
| 4,235,453 A | 11/1980 | Lawson et al. | |
| 4,286,954 A | 9/1981 | McArthur et al. | |

(Continued)

FOREIGN PATENT DOCUMENTS

JP 06255437 A 9/1994

(Continued)

OTHER PUBLICATIONS

Office Action issued Jun. 19, 2009 in U.S. Appl. No. 11/804,146, now U.S. Patent No. 7,735,862.

(Continued)

*Primary Examiner*—Paul N Dickson
*Assistant Examiner*—Timothy D Wilhelm
(74) *Attorney, Agent, or Firm*—Sally J Brown; Stoel Rives LLP

(57) ABSTRACT

Methods are provided for folding an airbag cushion into a housing. In one implementation of the inventive method, an airbag cushion defined by an upper panel and a lower panel is provided. A first portion of the airbag cushion is tucked into a second portion of the airbag cushion such that the upper and lower panels of the first portion are positioned in between the upper and lower panels of the second portion. The tucked portion is folded in towards the housing. First and second halves of the tucked airbag cushion are folded in towards the housing. Finally, the folded first and second halves of the airbag cushion are folded into the housing.

30 Claims, 8 Drawing Sheets

U.S. PATENT DOCUMENTS

| | | | |
|---|---|---|---|
| 4,351,544 A | 9/1982 | Ross | |
| 4,842,300 A | 6/1989 | Ziomek et al. | |
| 5,004,266 A | 4/1991 | Miller et al. | |
| 5,022,675 A | 6/1991 | Zelenak et al. | |
| 5,140,799 A * | 8/1992 | Satoh | 53/429 |
| 5,178,407 A | 1/1993 | Kelley | |
| 5,240,282 A | 8/1993 | Wehner et al. | |
| 5,246,250 A | 9/1993 | Wolanin et al. | |
| 5,290,061 A * | 3/1994 | Bollaert | 280/743.1 |
| 5,310,216 A | 5/1994 | Wehner et al. | |
| 5,346,248 A | 9/1994 | Rhein et al. | |
| 5,391,137 A | 2/1995 | DePoy et al. | |
| 5,398,968 A | 3/1995 | Emambakhsh et al. | |
| 5,407,227 A | 4/1995 | Lauritzen et al. | |
| 5,419,579 A * | 5/1995 | McPherson et al. | 280/743.1 |
| 5,425,551 A | 6/1995 | Hawthorn | |
| 5,447,329 A | 9/1995 | Hamada | |
| 5,452,913 A | 9/1995 | Hansen | |
| 5,454,595 A * | 10/1995 | Olson et al. | 280/743.1 |
| 5,492,363 A | 2/1996 | Hartmeyer et al. | |
| 5,492,367 A | 2/1996 | Albright et al. | |
| 5,496,056 A | 3/1996 | Dyer | |
| 5,531,477 A | 7/1996 | Madrigal et al. | |
| 5,538,281 A * | 7/1996 | Patercsak | 280/743.1 |
| 5,570,905 A * | 11/1996 | Dyer | 280/743.2 |
| 5,588,674 A | 12/1996 | Yoshimura et al. | |
| 5,613,698 A | 3/1997 | Patercsak et al. | |
| 5,630,614 A | 5/1997 | Conlee | |
| 5,694,737 A * | 12/1997 | Lunt et al. | 53/119 |
| 5,732,973 A * | 3/1998 | Turnbull et al. | 280/743.1 |
| 5,755,459 A | 5/1998 | LaLonde | |
| 5,765,867 A | 6/1998 | French | |
| 5,772,239 A | 6/1998 | Seymour | |
| 5,823,566 A | 10/1998 | Manire | |
| 5,823,567 A | 10/1998 | Behr et al. | |
| 5,899,495 A * | 5/1999 | Yamamoto et al. | 280/743.1 |
| 5,957,486 A | 9/1999 | Taguchi et al. | |
| 5,979,937 A | 11/1999 | Yoshida et al. | |
| 6,029,996 A | 2/2000 | Yoshioka et al. | |
| 6,056,318 A | 5/2000 | Braunschadel | |
| 6,110,094 A | 8/2000 | Wallentin et al. | |
| 6,131,944 A | 10/2000 | Henkel et al. | |
| 6,142,517 A * | 11/2000 | Nakamura et al. | 280/739 |
| 6,155,598 A | 12/2000 | Kutchey | |
| 6,186,544 B1 | 2/2001 | Igawa | |
| 6,196,585 B1 | 3/2001 | Igawa | |
| 6,203,062 B1 | 3/2001 | Kusaka et al. | |
| 6,286,866 B1 | 9/2001 | Satge et al. | |
| 6,299,202 B1 | 10/2001 | Okada et al. | |
| 6,352,283 B1 * | 3/2002 | Ellerbrok et al. | 280/743.1 |
| 6,371,510 B1 | 4/2002 | Marriott et al. | |
| 6,390,500 B1 * | 5/2002 | Yamada et al. | 280/743.1 |
| 6,398,258 B2 | 6/2002 | Hamada et al. | |
| 6,432,033 B1 | 8/2002 | Salzmann et al. | |
| 6,474,686 B1 | 11/2002 | Higuchi et al. | |
| 6,499,765 B2 | 12/2002 | Hawthorn et al. | |
| 6,557,891 B2 | 5/2003 | Okada et al. | |
| 6,619,691 B1 | 9/2003 | Igawa | |
| 6,669,229 B2 | 12/2003 | Thomas | |
| 6,682,093 B2 | 1/2004 | Tajima et al. | |
| 6,692,024 B2 * | 2/2004 | Fischer et al. | 280/743.1 |
| 6,739,622 B2 | 5/2004 | Halford et al. | |
| 6,767,030 B2 | 7/2004 | Yamaji et al. | |
| 6,830,266 B2 | 12/2004 | Abe | |
| 6,832,779 B2 | 12/2004 | Tajima et al. | |
| 6,874,810 B2 | 4/2005 | Soderquist | |
| 6,877,772 B2 | 4/2005 | Fischer et al. | |
| 6,883,381 B2 | 4/2005 | Kolb et al. | |
| 6,883,831 B2 | 4/2005 | Hawthorn et al. | |
| 6,942,242 B2 | 9/2005 | Hawthorn et al. | |
| 6,945,562 B2 | 9/2005 | Abe | |
| 6,955,377 B2 | 10/2005 | Cooper et al. | |
| 6,971,671 B2 | 12/2005 | Schneider et al. | |
| 6,988,743 B2 * | 1/2006 | Okamoto et al. | 280/743.1 |
| 7,083,191 B2 | 8/2006 | Fischer | |
| 7,150,470 B2 | 12/2006 | Okada et al. | |
| 7,223,224 B2 | 5/2007 | Card et al. | |
| 7,232,153 B2 | 6/2007 | Kawauchimaru et al. | |
| 7,237,802 B2 | 7/2007 | Rose et al. | |
| 7,293,795 B2 | 11/2007 | Kong | |
| 7,347,450 B2 | 3/2008 | Williams et al. | |
| 7,404,570 B2 | 7/2008 | Miyata | |
| 7,441,804 B2 | 10/2008 | Rose et al. | |
| 7,441,805 B2 * | 10/2008 | Jamison et al. | 280/743.2 |
| 7,445,239 B2 | 11/2008 | Okada et al. | |
| 7,481,455 B2 | 1/2009 | Iida et al. | |
| 7,530,597 B2 | 5/2009 | Bito | |
| 7,735,862 B2 | 6/2010 | Choi | |
| 2002/0020990 A1 | 2/2002 | Sinnhuber et al. | |
| 2003/0001366 A1 | 1/2003 | Debler et al. | |
| 2003/0189319 A1 | 10/2003 | Soderquist | |
| 2003/0234520 A1 | 12/2003 | Hawthorn et al. | |
| 2004/0251669 A1 | 12/2004 | Fischer et al. | |
| 2005/0134032 A1 * | 6/2005 | Downing et al. | 280/743.1 |
| 2006/0012157 A1 | 1/2006 | Ishiguro et al. | |
| 2006/0131847 A1 | 6/2006 | Sato et al. | |
| 2006/0244248 A1 | 11/2006 | Rose et al. | |
| 2007/0052221 A1 | 3/2007 | Okada et al. | |
| 2007/0057487 A1 | 3/2007 | Kim | |
| 2007/0120346 A1 | 5/2007 | Kwon | |
| 2007/0126219 A1 | 6/2007 | Williams | |
| 2007/0138779 A1 | 6/2007 | Kwon | |
| 2007/0170710 A1 | 7/2007 | Bouquier | |
| 2007/0278772 A1 | 12/2007 | Burghardt et al. | |
| 2008/0023950 A1 | 1/2008 | Kalczynski et al. | |
| 2008/0203713 A1 | 8/2008 | McFadden et al. | |
| 2008/0217887 A1 | 9/2008 | Seymour et al. | |
| 2008/0217892 A1 | 9/2008 | Maripudi | |
| 2008/0284140 A1 | 11/2008 | Choi | |
| 2009/0039630 A1 | 2/2009 | Schneider et al. | |
| 2009/0102173 A1 | 4/2009 | Rose et al. | |
| 2009/0108574 A1 | 4/2009 | Lachat et al. | |
| 2009/0152842 A1 | 6/2009 | Benny et al. | |
| 2009/0256340 A1 | 10/2009 | Williams et al. | |

FOREIGN PATENT DOCUMENTS

| | | |
|---|---|---|
| JP | 2005 343267 | 12/2005 |
| WO | WO 2008/109202 | 9/2008 |

OTHER PUBLICATIONS

Amendment and Response to Office Action issued Jun. 19, 2008, in U.S. Appl. No. 11/804,146, now U.S. Patent No. 7,735,862.

Notice of Allowance and Fee(s) Due issued Feb. 25, 2010 in U.S. Appl. No. 11/804,146, now U.S. Patent No. 7,735,862.

Examiner's Amendment issued May 10, 2010 in U.S. Appl. No. 11/804,146, now U.S. Patent No. 7,735,862.

Response to Office Action and Terminal Disclaimer filed Sep. 9, 2010 in co-pending U.S. Appl. No. 12/259,221.

U.S. Appl. No. 12/536,360 filed Aug. 5, 2009, Titled Safety Venting With Passively Closeable Vents.

U.S. Appl. No. 12/580,488 filed Oct. 16, 2009, for Inflatable Airbag Cushions With Deployment Flaps and Methods for Folding.

* cited by examiner

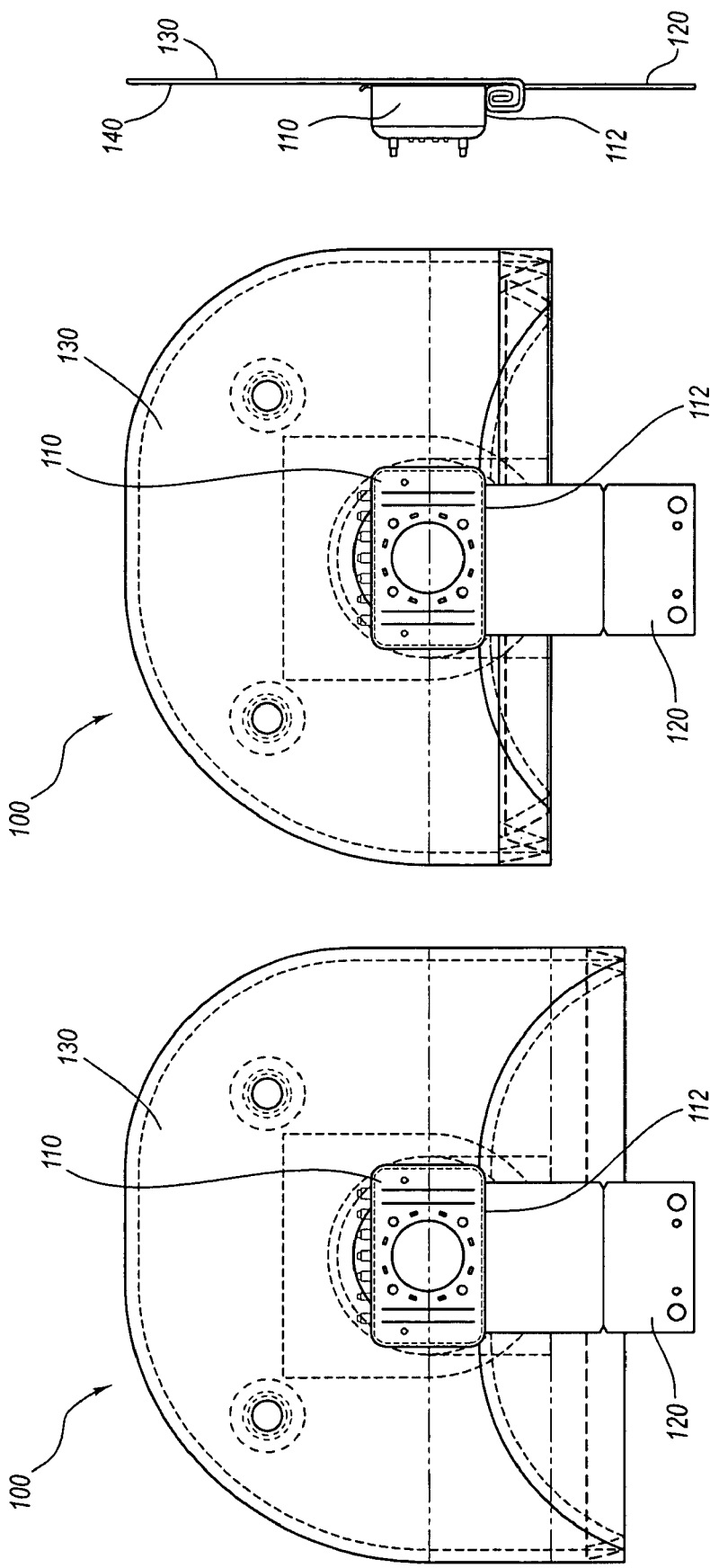

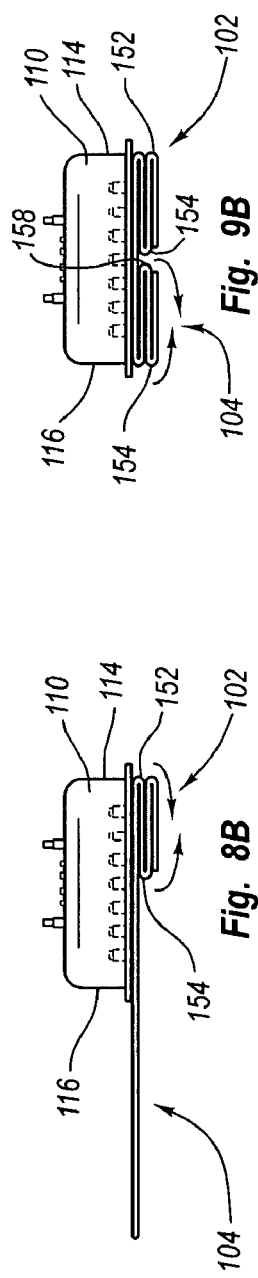
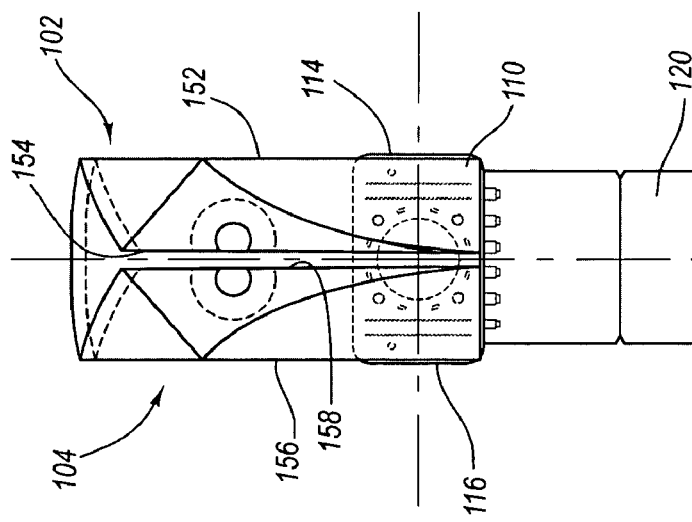
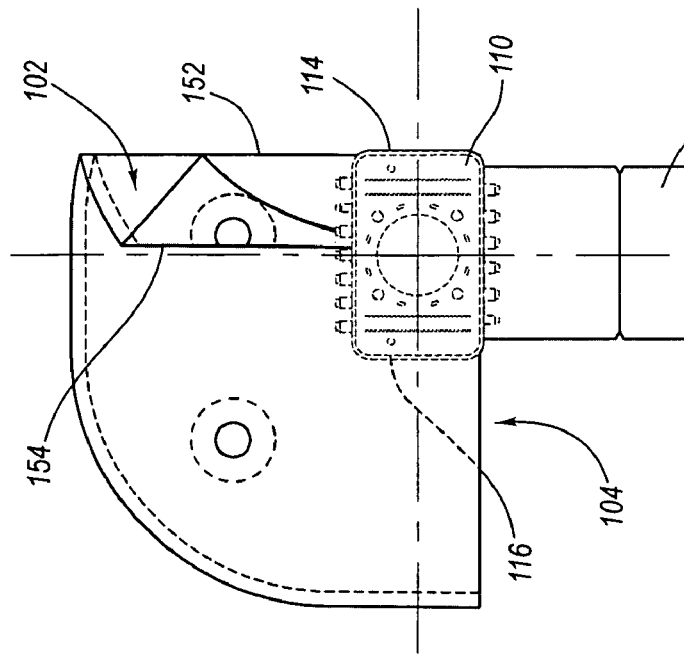
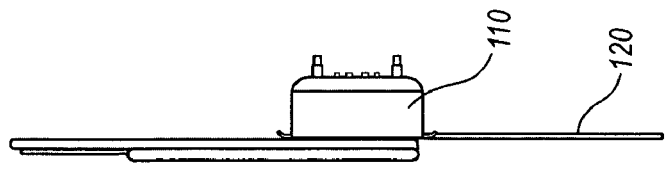

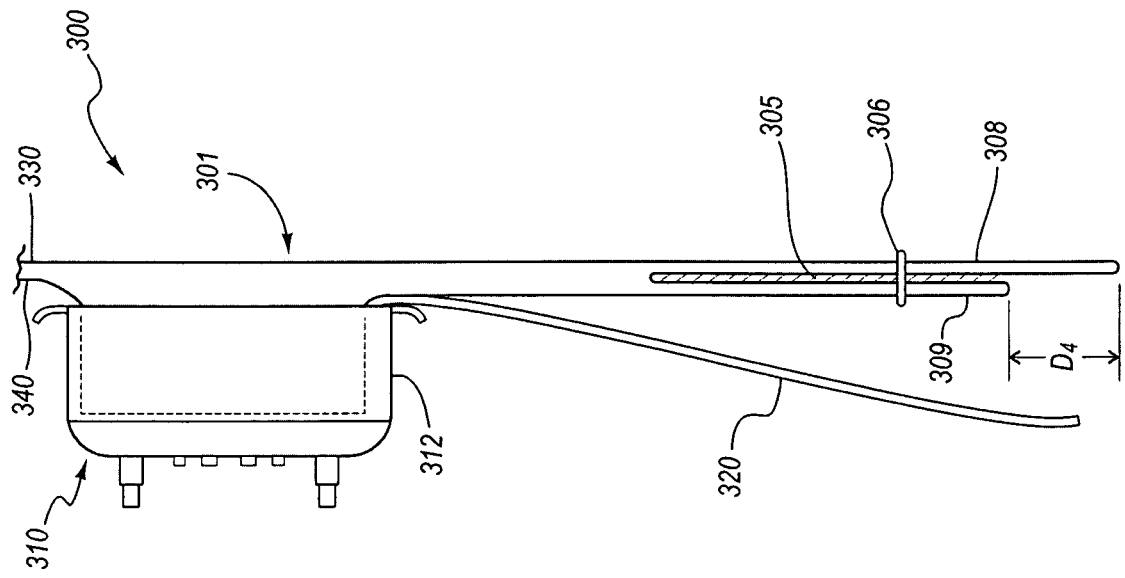
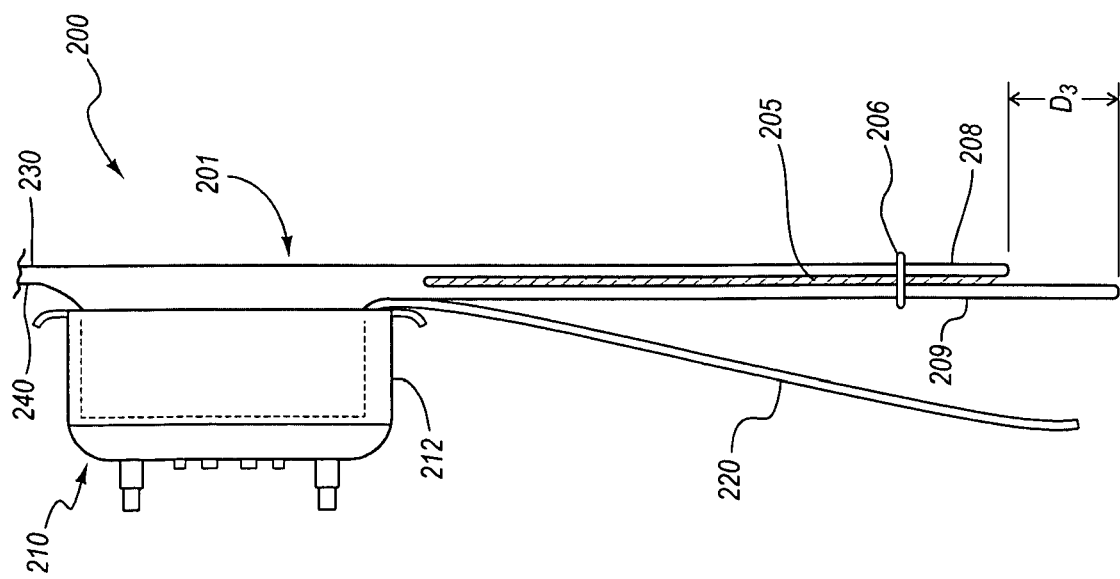

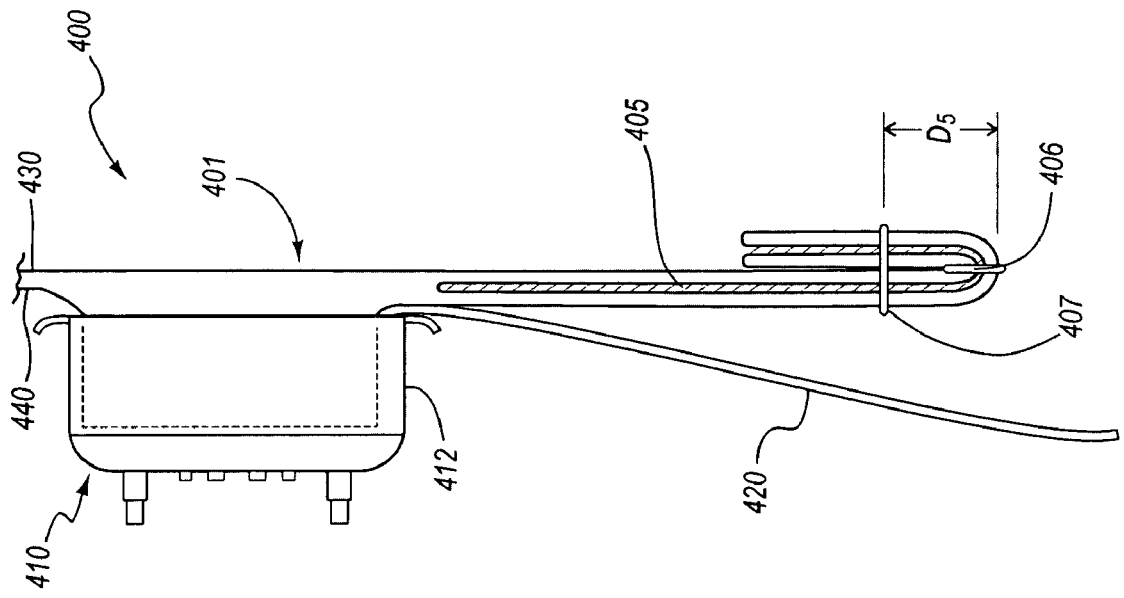

AIRBAG CUSHION FOLDING METHODS

RELATED APPLICATIONS

The present disclosure is a continuation-in-part of U.S. patent application Ser. No. 12/259,221, which was filed on Oct. 27, 2008. U.S. patent application Ser. No. 12/259,221 is a continuation-in-part of U.S. patent application Ser. No. 11/115,928, which was filed on Apr. 27, 2005 and published as U.S. Patent Publication No. 2006/0244248. Both of the above U.S. patent applications are hereby incorporated by reference.

TECHNICAL FIELD

The present invention relates generally to the field of automotive protective systems. More specifically, the present invention relates to inflatable airbags for automobiles.

BRIEF DESCRIPTION OF THE DRAWINGS

Understanding that drawings depict only typical embodiments of the invention and are not therefore to be considered to be limiting of its scope, the invention will be described and explained with additional specificity and detail through the use of the accompanying drawings.

FIG. 4 is a top plan view of the airbag cushion assembly after a first fold has been applied to the tucked portion.

FIG. 5A is a top plan view of the airbag cushion assembly after additional folds have been applied to the tucked portion, such that one side of the folded tucked portion is at least approximately even with one side of the housing.

FIG. 5B is a side elevation view of the airbag cushion assembly at the same stage of the folding method as shown in FIG. 5A.

FIG. 8A is a top plan view of the airbag cushion assembly after a first half of the airbag cushion has been folded until one side of the folded first half is approximately even with a side of the housing.

FIG. 8B is a top elevation view of the airbag cushion assembly at the same stage of the folding method as shown in FIG. 8A.

FIG. 9A is a top plan view of the airbag cushion assembly after a second half of the airbag cushion has been folded until one side of the folded second half is approximately even with a side of the housing.

FIG. 9B is a top elevation view of the airbag cushion assembly at the same stage of the folding method as shown in FIG. 9A.

FIG. 9C is a side elevation view of the airbag cushion assembly at the same stage of the folding method as shown in FIGS. 9A and 9B.

FIG. 12 is a side elevation view of another embodiment of an airbag assembly.

FIG. 13 is a side elevation view of another embodiment of an airbag assembly.

FIG. 14 is a side elevation view of another embodiment of an airbag assembly.

DETAILED DESCRIPTION OF PREFERRED EMBODIMENTS

Described below are embodiments of methods for folding automotive airbags. In the following description, numerous specific details are provided for a thorough understanding of the embodiments of the invention. However, those skilled in the art will recognize that the invention can be practiced without one or more of the specific details, or with other methods, components, materials, etc.

In addition, in some cases, well-known structures, materials, or operations are not shown or described in detail in order to avoid obscuring aspects of the invention. Furthermore, the described features, structures, steps, or characteristics may be combined in any suitable manner in one or more embodiments.

In one implementation of the inventive method, an airbag cushion defined by an upper panel and a lower panel is provided. A first portion of the airbag cushion is tucked into a second portion of the airbag cushion such that the upper and lower panels of the first portion are positioned in between the upper and lower panels of the second portion. The tucked portion is folded in towards the housing. First and second halves of the tucked airbag cushion are folded in towards the housing from opposite directions. Finally, the folded first and second halves of the airbag cushion are folded into the housing.

Figure 1:
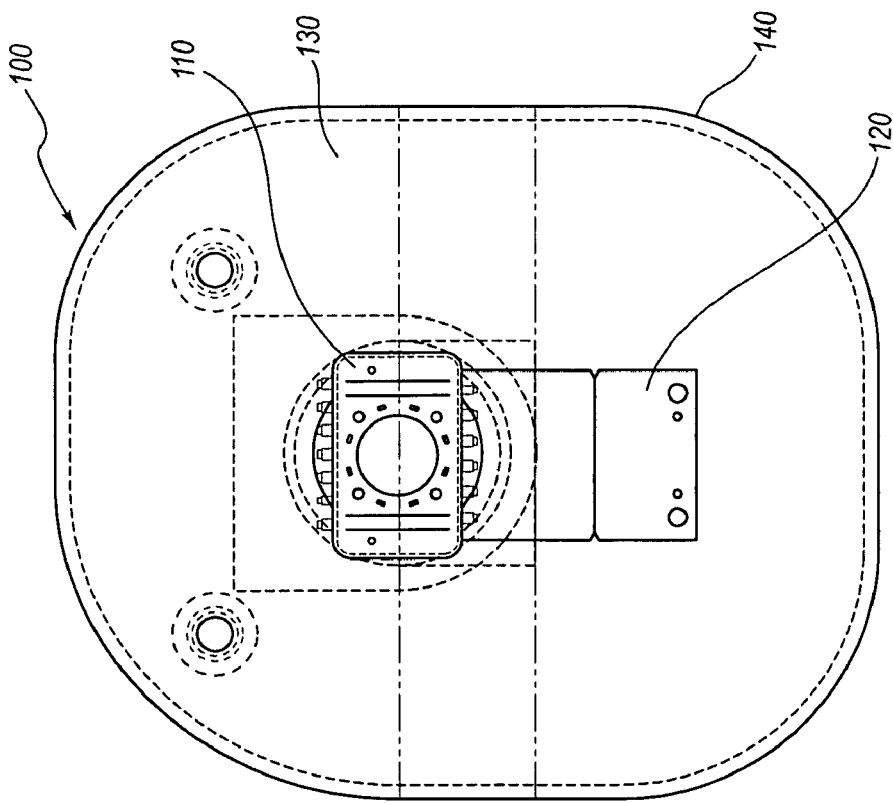
FIG. 1 is a top plan view of an embodiment of an airbag cushion assembly.

With reference now to the accompanying figures, an example of a method according to the invention will be described in greater detail. FIG. 1 depicts an airbag cushion assembly 100, which may comprise an airbag cushion membrane 101 that is attached to a housing 110. A flap 120 is also attached to the housing 110 and may comprise a packaging flap and/or a deployment flap. Flap 120 may be used to secure the airbag cushion 101 inside the housing 110 after the airbag cushion 101 has been completely folded into the housing 110. Additionally, flap 120 may comprise a deployment flap that may reduce unfavorable interactions between an out of position occupant, such as a rear facing child car seat, and cushion 101. Airbag cushion 101 is defined by an upper panel 130 and a lower panel 140, which are attached to one another along the periphery of airbag cushion 101.

Figure 2:
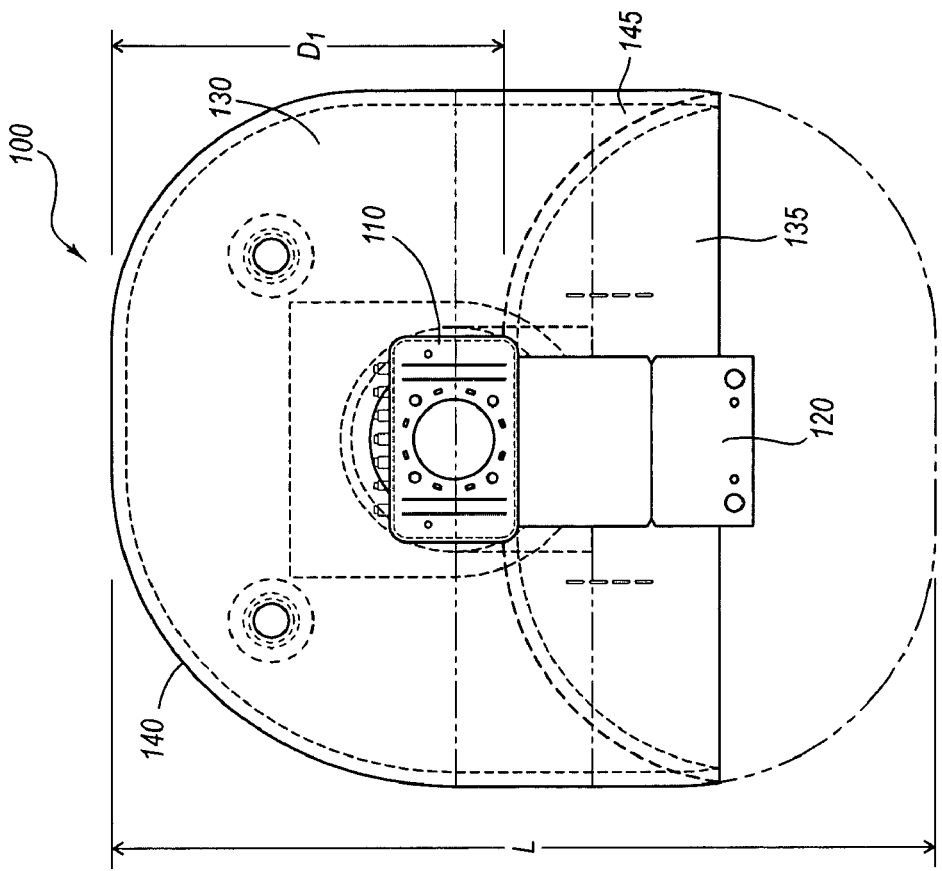
FIG. 2 is a top plan view of the airbag cushion assembly after a tucking step has been performed.

In one implementation of a method according to the invention, the airbag cushion 101 is tucked into itself, "outside-in" at one end. In other words, a first portion of the airbag cushion is tucked into a second portion of the airbag cushion such that the upper and lower panels of the first portion are positioned in between the upper and lower panels of the second portion. FIG. 2 depicts airbag cushion 101 after performance of this "tucking" step. The upper and lower panels of the first portion are referenced jointly at 135 and are both positioned in between the upper and lower panels of the second portion, which are referenced jointly at 145.

As can be seen in FIG. 2, the first portion of the airbag cushion has been tucked into the second portion of the airbag cushion to a distance of about fifty percent of the length of the airbag cushion prior to the tucking step. Otherwise stated, distance $D_1$ is about one-half of distance L. In one embodiment, $D_1$ may be about 400 mm and L may be about 800 mm. In some implementations of the inventive method, such as is shown in the accompanying figures, the first portion of the airbag cushion is tucked into the second portion of the airbag cushion to a distance of at least about twenty percent of the length of the airbag cushion prior to the tucking step. In some such implementations, the first portion of the airbag cushion is tucked into the second portion of the airbag cushion to a distance of between about twenty percent and about fifty percent of the length of the airbag cushion prior to the tucking step.

After tucking a portion of the airbag cushion into itself, optionally, a light tack stitch or tear stitch 106 may be applied to two or more of the tucked layers of the airbag cushion in order to maintain the tuck during further folding and handling of the airbag cushion. The light stitching applied to the tucked portion of the airbag cushion may be positioned in a center portion of the cushion. Moreover, it may be desirable in some embodiments to extend the stitching across no more than one-half of the total width of the cushion. The stitching may be applied to two layers of the airbag cushion or more, up to the total number of layers in the tucked portion (four in the embodiment shown in the figures). The stitch count in one embodiment includes no more than 25 threads per 100 mm, thereby allowing the stitch to break away upon inflation of the airbag cushion without damaging the airbag cushion. Of course, those having skill in the art will appreciate that other thread counts may similarly provide for a stitch that will break away cleanly upon inflation without damaging the airbag cushion.

Figure 3B:
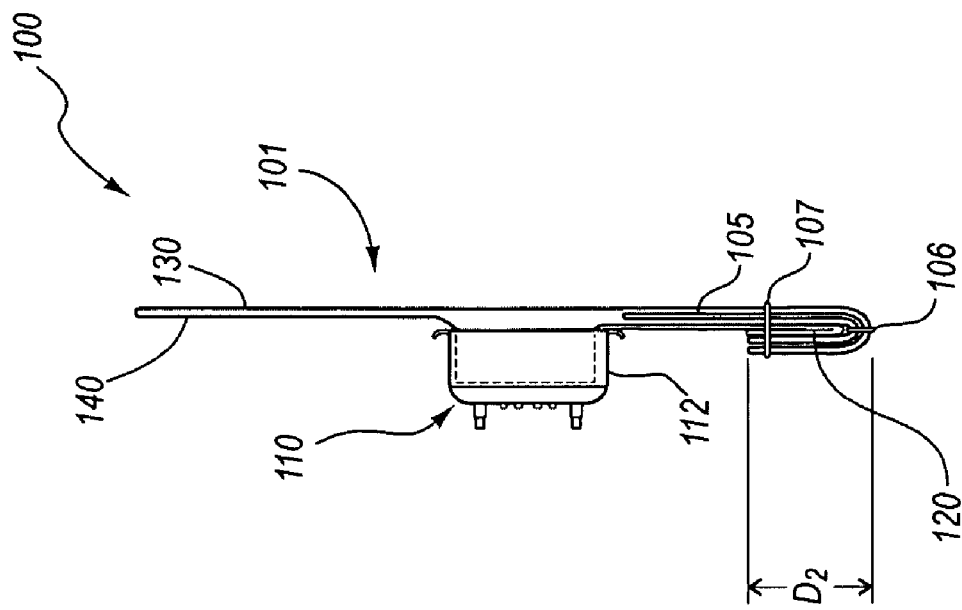
FIG. 3B is a side elevation view of the airbag cushion assembly after a folding step has been performed.
Figure 3A:
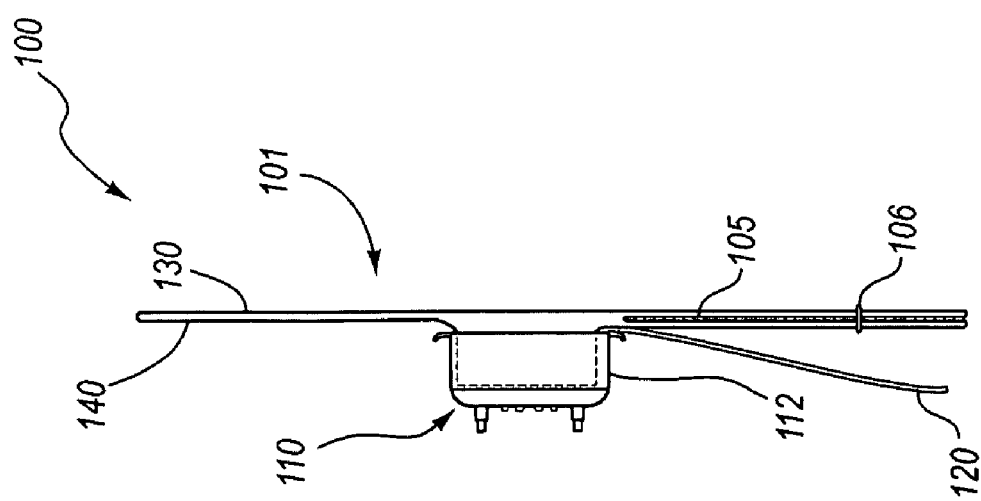
FIG. 3A is a side elevation view of the airbag cushion assembly after the tucking step has been performed.

FIGS. 3A and 3B depict cushion assembly 100 from side elevation views, wherein FIG. 3A depicts cushion 101 after a portion of the cushion has been tucked into itself in the direction of first side 112 of housing 110 such that a tucked portion 105 is formed. As noted above, optional tear stitching 106 may be applied to retain the tucked portion in a predetermined configuration. As depicted in FIG. 3B, after tucking the airbag cushion 101 into itself at one end and, optionally, applying a light stitch to the tucked portion 105 of the airbag cushion 101, the tucked portion is folded in towards the housing 110. In the implementation shown in the drawings, tucked portion 105 is reverse rolled or folded one time to a distance of $D_2$. Distance $D_2$ may be from about 25 mm to about 50 mm. A reverse roll may be defined as being begun by being folded toward a rear panel 140 side of cushion 101. A second set of tear stitches 107 may optionally be applied to the tucked and folded portion. If tear stitches were not applied to the tucked portion before the tucked portion was folded, then tear stitches 107 will not comprise a second set of stitching, but rather a first set of stitching.

FIG. 4 depicts the airbag cushion 101 after a first fold has been applied to the tucked portion. As depicted in FIGS. 5A and 5B the tucked portion is folded multiple times until one side of the folded tucked portion is at least approximately even with a first side 112 of the housing 110. Note that the housing need not have a rectangular cross section as does housing 110 in the accompanying figures. Thus, the term "side" is intended to encompass portions of the housing that may not be straight. For example, in embodiments having a housing with a circular cross-section, folding the tucked portion until one side is at least approximately even with a first side of the housing may refer to folding the tucked portion until one side of the folded tucked portion is approximately tangent to a portion of the housing.

FIGS. 5A and 5B depict the airbag cushion 101 after the tucked portion has been folded multiple times until one side of the folded tucked portion is at least approximately even with a first side 112 of the housing 110. In other implementations of the method, the tucked portion may be rolled towards the housing instead of folded multiple times. The meaning of the word "fold" should therefore encompass rolling as well as more conventional "folding" as shown in FIGS. 4 and 5A-5B. As discussed in greater detail below, the term "fold" should further encompass "accordion" folding. Of course, "folding" could also comprise a combination of one or more of the above-described "folds". For example, "folding" the tucked portion until one side of the folded tucked portion is at least approximately even with a first side of the housing could comprise one or more traditional folds followed by rolling the tucked portion to the housing.

Figure 7:
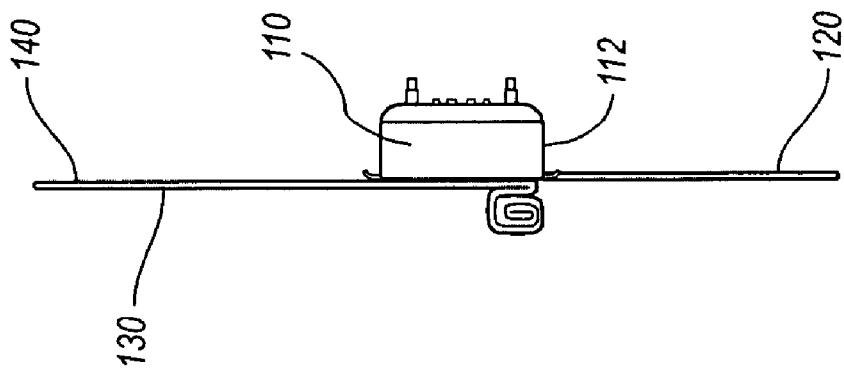
FIG. 7 is a side elevation view of the airbag cushion assembly after the folded portion has been folded over the housing opening.
Figure 6:
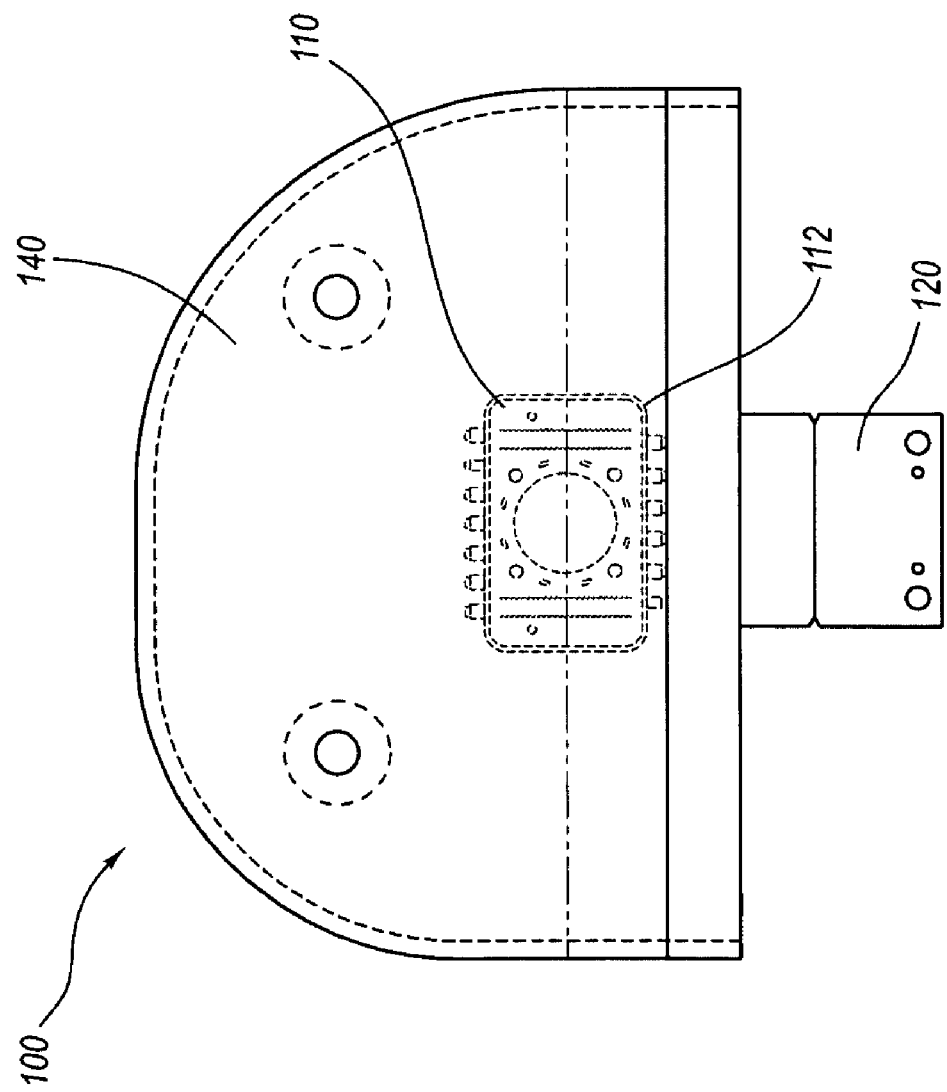
FIG. 6 is a top plan view of the airbag cushion assembly after it has been turned over such that the housing is underneath the airbag cushion.

As shown in FIGS. 6 and 7, optionally airbag cushion assembly 100 (including the housing 110) may be flipped over, as shown in FIG. 6, and then the folded portion rolled or otherwise folded over the housing opening such that at least a portion of the folded portion is positioned above the housing opening, as shown in FIG. 7. In FIGS. 5A-6, the tucked portion has been folded multiple times until one side of the folded tucked portion is at least approximately even with a first side 112 of the housing 110 and has been folded as such so that the remainder of the folded tucked portion of the airbag cushion 101 extends away from the housing. However, in the depicted implementation, after the steps discussed with reference to FIGS. 6 and 7 have been performed, the folded tucked portion of the airbag cushion 101 still has one side approximately even with first side 112 of housing 110, but is now positioned such that the remainder of the folded tucked portion extends towards the direction of the housing 110. A portion of the folded airbag cushion 101 may also be tucked into the housing at this time if desired.

After the tucked portion has been folded up to the housing, a first half 102 and a second half 104 of the airbag cushion 101 are folded in towards the housing 110. As can be seen in FIGS. 8A-9B, first half 102 of the airbag cushion 101 includes approximately half of the tucked portion and second half 104 includes the other half of the tucked portion. In the implementation shown in the drawings, first half 102 is folded until a first side 152 of the folded first half 102 of the airbag cushion is approximately even with a second side 114 of the housing 110. A second side 154 of the folded first half 102 of the airbag cushion, opposite from first side 152, is approximately aligned with the center of the housing 110, as shown in FIGS. 8A and 8B.

As best seen in FIG. 8B, in the depicted implementation first half 102 has been folded in towards housing 110 with an "accordion" fold. In other words, the folds alternate in direction such that the folded sections can be stacked on one another. Of course, other folding options are available. For instance, first half 102 may be folded multiple times in the same direction instead of back and forth as in accordion folding. Alternatively, first half 102 may be simply rolled in towards the housing 110. As previously discussed, each of the aforementioned steps should be considered within the scope of the term "fold".

As shown in FIGS. 9A-9C, second half 104 may be folded in towards housing 110 in a similar manner. Specifically, second half 104 is folded until a first side 156 of the folded second half 104 is approximately even with a third side 116 of the housing 110. A second side 158 of the folded second half 104, opposite from first side 156, is approximately aligned with the center of the housing 110.

Figure 11:
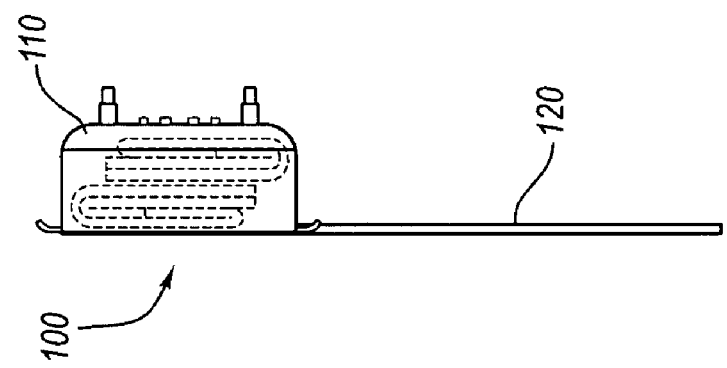
FIG. 11 is a side elevation view of the airbag cushion assembly after the airbag cushion has been folded and tucked into the housing.
Figure 10:
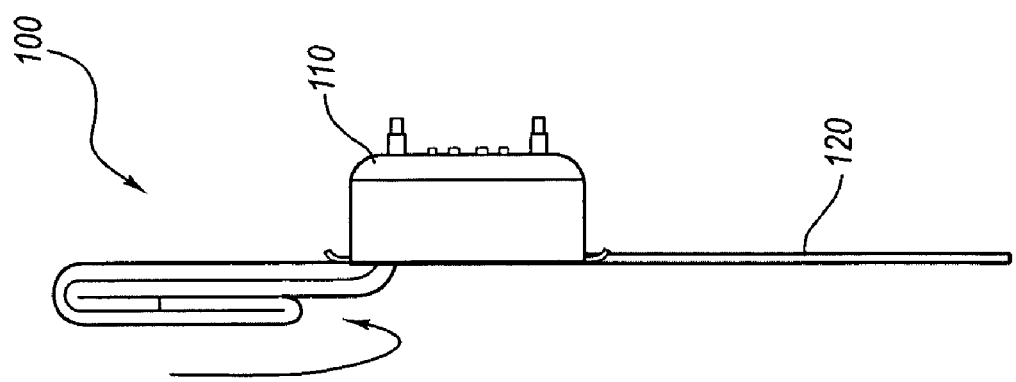
FIG. 10 is a side elevation view of the airbag cushion assembly after the airbag cushion has been partially folded towards the housing.

After first half 102 and second half 104 have been folded in towards the housing 110, the folded first and second halves of the airbag cushion may be folded again, this time together, in the same direction, and down into the housing 110. As shown in FIGS. 10 and 11, the remainder of the airbag cushion 101, which includes folded first half 102 and folded second half 104, is folded (e.g., folded end-over-end, accordion folded, or rolled) into housing 110. Flap 120 may then be wrapped around the assembly and secured.

FIG. 12 is a side elevation view of an alternative embodiment of a method for folding an airbag cushion 201 that is a component of airbag assembly 200. Cushion 201 comprises an upper panel 230 and a lower panel 240, wherein the cushion is coupled to a housing 210 and may be disclosed adjacent to a deployment flap 220. In the depicted embodiment, a tucked portion 205 is formed by tucking a portion of the cushion into itself in the direction of a first side 212 of housing 210. The tucking step results in an upper tucked portion 208 and a lower tucked portion 209 and in the depicted embodiment, the two portions are not of equal lengths and differ by a distance $D_3$. In some embodiments, distance D3 may be from about 50 mm to about 100 mm. The tuck depicted in FIG. 12 may be said to be "shifted over." Tucked portion 205 may optionally be retained by using a first set of tear stitching 206.

FIG. 13 is a side elevation view of an alternative embodiment of a method for folding an airbag cushion 301 that is a component of airbag assembly 300. Cushion 301 comprises an upper panel 330 and a lower panel 340, wherein the cushion is coupled to a housing 310 and may be disclosed adjacent to a deployment flap 320. In the depicted embodiment, a tucked portion 305 is formed by tucking a portion of the cushion into itself in the direction of a first side 312 of housing 310. The tucking step results in an upper tucked portion 308 and a lower tucked portion 309 and in the depicted embodiment, the two portions are not of equal lengths and differ by a distance $D_4$. In some embodiments, distance $D_4$ may be from about 50 mm to about 100 mm. The tuck depicted in FIG. 13 may be said to be "shifted under." Tucked portion 305 may optionally be retained by using a first set of tear stitching 306.

FIG. 14 is a side elevation view of an alternative embodiment of a method for folding an airbag cushion 401 that is a component of airbag assembly 400. Cushion 401 comprises an upper panel 430 and a lower panel 440, wherein the cushion is coupled to a housing 410 and may be disclosed adjacent to a deployment flap 420. A tucked portion 405 is formed by tucking a portion of the cushion into itself in the direction of a first side 412 of housing 410. Tucked portion 405 may optionally be retained by using a first set of tear stitching 406. Tucked portion 405 may be forward folded to a distance $D_5$ and may be retained in the tucked and folded configuration via a second set of tear stitching 407. In some embodiments, distance $D_5$ may be from about 50 mm to about 100 mm. Certain implementations of the inventive method can be used to produce an airbag assembly with desirable inflation characteristics. For instance, in many of the above-described embodiments, the folding method employed causes the top of the airbag cushion to deploy first, followed by the sides. The bottom of the airbag cushion will typically be the last portion to inflate, due to the tuck, which holds the bottom portion inside the housing until the top and sides have been inflated. This may be a desirable inflation scenario for some applications.

Application of a light stitching to the tucked portion, as described in detail above, may further enhance certain desirable inflation characteristics. For example, the stitching may allow for further delay of expansion of the bottom portion. The timing of the delay may also be tuned by altering the strength and position of the stitching. Moreover, in embodiments in which the stitching is positioned in a center portion of the cushion, the unstitched sides of the airbag cushion may tend to inflate first, thereby causing the stitch to fail from the sides towards the center. Thus, the stitching and folding methods described herein may be used to provide a variety of different inflation characteristics as desired.

Without further elaboration, it is believed that one skilled in the art can use the preceding description to utilize the invention to its fullest extent. The examples and embodiments disclosed herein are to be construed as merely illustrative and not a limitation of the scope of the present invention in any way. It will be apparent to those having skill in the art that changes may be made to the details of the above-described embodiments without departing from the underlying principles of the invention. In other words, various modifications and improvements of the embodiments specifically disclosed in the description above are within the scope of the appended claims. The scope of the invention is therefore defined by the following claims.

The invention claimed is:

1. A method for folding an airbag cushion into a housing, comprising:

obtaining an airbag cushion defined by an upper panel and a lower panel, wherein the airbag cushion is attached to a housing;

tucking a first portion of the airbag cushion into a second portion of the airbag cushion such that the upper and lower panels of the first portion are positioned in between the upper and lower panels of the second portion;

directly joining at least two adjacent layers of the tucked portion of the airbag cushion together, wherein the step of directly joining at least two adjacent layers is performed after the step of tucking a first portion of the airbag cushion into a second portion of the airbag cushion;

folding the tucked portion one time in the direction of the housing;

directly joining at least two adjacent layers of the tucked and folded portion of the airbag cushion together, wherein the step of directly joining at least two adjacent layers is performed after the step of folding the tucked portion one time in the direction of the housing;

continuing to fold the tucked portion until one side of the folded tucked portion is at least approximately even with a first side of the housing;

folding a first half of the airbag cushion until a first side of the folded first half of the airbag cushion is at least approximately even with a second side of the housing, wherein the first half of the airbag cushion includes approximately half of the tucked portion, and wherein the step of folding a first half of the airbag cushion is performed after the steps of tucking a first portion of the airbag cushion and folding the tucked portion;

folding a second half of the airbag cushion until a first side of the folded second half of the airbag cushion is at least approximately even with a third side of the housing, wherein the second half of the airbag cushion includes approximately half of the tucked portion, and wherein the step of folding a second half of the airbag cushion is performed after the steps of tucking a first portion of the airbag cushion and folding the tucked portion; and folding the folded first and second halves of the airbag cushion into the housing.

2. The method of claim 1, wherein the step of joining at least two layers of the tucked and folded portion of the airbag cushion together comprises stitching at least two layers of the tucked portion of the airbag cushion together.

3. The method of claim 2, wherein a stitch placed in the tucked and folded portion extends through each of the layers of the tucked portion.

4. The method of claim 2, wherein a stitch placed in the tucked and folded portion is a light stitch so as to allow the stitch to break away upon inflation of the airbag cushion without damaging the airbag cushion.

5. The method of claim 2, wherein a stitch placed in the tucked and folded portion extends across no more than about half of the total width of the airbag cushion.

6. The method of claim 5, wherein the stitch placed in the tucked and folded portion is positioned in a center portion of the cushion such that, upon inflation, the unstitched sides of the airbag cushion inflate first, thereby causing the stitch to fail from the sides towards the center.

7. The method of claim 1, wherein the step of folding the tucked portion one time in the direction of the housing comprises reverse folding the tucked portion.

8. The method of claim 1, wherein the step of folding the tucked portion one time in the direction of the housing comprises forward folding the tucked portion.

9. The method of claim 1, wherein the step of continuing to fold the tucked portion comprises reverse rolling the tucked portion until the tucked portion is at least approximately even with a first side of the housing.

10. The method of claim 1, wherein the step of continuing to fold the tucked portion comprises forward rolling the tucked portion until the tucked portion is at least approximately even with a first side of the housing.

11. The method of claim 1, wherein the steps of folding a first and second half of the airbag cushion comprises reverse rolling the first and second halves.

12. The method of claim 1, wherein the step of folding the folded first and second halves of the airbag cushion into the housing comprises accordion-folding the folded first and second halves of the airbag cushion.

13. The method of claim 1, wherein, following the step of folding a first half of the airbag cushion, a second side of the folded first half of the airbag cushion opposite from the first side is approximately aligned with the center of the housing.

14. The method of claim 1, wherein, following the step of folding a second half of the airbag cushion, a second side of the folded second half of the airbag cushion opposite from the first side is approximately aligned with the center of the housing.

15. The method of claim 1, wherein the first portion of the airbag cushion is tucked into the second portion of the airbag cushion to a distance of at least about twenty percent of the length of the airbag cushion prior to the tucking step.

16. An airbag cushion assembly, comprising an airbag cushion folded into a housing in accordance with the method of claim 1.

17. A method for folding an airbag cushion into a housing, comprising:

obtaining an airbag cushion defined by an upper panel and a lower panel, wherein the airbag cushion is attached to a housing;

tucking a first portion of the airbag cushion into a second portion of the airbag cushion such that the upper and lower panels of the first portion are positioned in between the upper and lower panels of the second portion, wherein the tuck forms an upper tucked portion and a lower tucked portion, and wherein the upper and lower tucked portions do not comprise equal lengths as measured from a first side of the housing;

directly joining at least two adjacent layers of the tucked portion of the airbag cushion together, wherein the step of directly joining at least two adjacent layers is performed after the step of tucking a first portion of the airbag cushion into a second portion of the airbag cushion;

folding the tucked portion until one side of the folded tucked portion is at least approximately even with the first side of the housing;

folding a first half of the airbag cushion until a first side of the folded first half of the airbag cushion is at least approximately even with a second side of the housing, wherein the first half of the airbag cushion includes approximately half of the tucked portion, and wherein the step of folding a first half of the airbag cushion is performed after the steps of tucking a first portion of the airbag cushion and folding the tucked portion;

folding a second half of the airbag cushion until a first side of the folded second half of the airbag cushion is at least approximately even with a third side of the housing, wherein the second half of the airbag cushion includes approximately half of the tucked portion, and wherein the step of folding a second half of the airbag cushion is performed after the steps of tucking a first portion of the airbag cushion and folding the tucked portion; and folding the folded first and second halves of the airbag cushion into the housing.

18. The method of claim 17, wherein the lower tucked portion extends further away from the airbag housing than the upper tucked portion.

19. The method of claim 17, wherein the upper tucked portion extends further away from the airbag housing than the lower tucked portion.

20. The method of claim 17, wherein the step of joining at least two layers of the tucked portion of the airbag cushion together comprises stitching at least two layers of the tucked portion of the airbag cushion together.

21. The method of claim 20, wherein a stitch placed in the tucked portion extends through each of the layers of the tucked portion.

22. The method of claim 20, wherein a stitch placed in the tucked portion is a light stitch so as to allow the stitch to break away upon inflation of the airbag cushion without damaging the airbag cushion.

23. The method of claim 20, wherein a stitch placed in the tucked portion extends across no more than about half of the total width of the airbag cushion.

24. The method of claim 23, wherein the stitch placed in the tucked portion is positioned in a center portion of the cushion such that, upon inflation, the unstitched sides of the airbag cushion inflate first, thereby causing the stitch to fail from the sides towards the center.

25. The method of claim 17, wherein the steps of folding a first and second half of the airbag cushion comprises reverse rolling the first and second halves.

26. The method of claim 17, wherein the step of folding the folded first and second halves of the airbag cushion into the housing comprises accordion-folding the folded first and second halves of the airbag cushion.

27. The method of claim 17, wherein, following the step of folding a first half of the airbag cushion, a second side of the folded first half of the airbag cushion opposite from the first side is approximately aligned with the center of the housing.

28. The method of claim 17, wherein, following the step of folding a second half of the airbag cushion, a second side of the folded second half of the airbag cushion opposite from the first side is approximately aligned with the center of the housing.

29. The method of claim 17, wherein the first portion of the airbag cushion is tucked into the second portion of the airbag cushion to a distance of at least about twenty percent of the length of the airbag cushion prior to the tucking step.

30. An airbag cushion assembly, comprising an airbag cushion folded into a housing in accordance with the method of claim 17.

* * * * *